(12) United States Patent
Chen et al.

(10) Patent No.: US 8,406,912 B2
(45) Date of Patent: Mar. 26, 2013

(54) SYSTEM AND METHOD FOR DATA MINING AND FEATURE TRACKING FOR FAB-WIDE PREDICTION AND CONTROL

(75) Inventors: Jui-Long Chen, Taichung (TW); Chia-Tong Ho, Taipei (TW); Po-Feng Tsai, Taipei (TW); Hui-Yun Chao, Zhubei (TW); Jong-I Mou, Hsinpu Township, Hsinchu County (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 343 days.

(21) Appl. No.: 12/823,351

(22) Filed: Jun. 25, 2010

(65) Prior Publication Data

US 2011/0320026 A1 Dec. 29, 2011

(51) Int. Cl.
  *G06F 19/00* (2011.01)
(52) U.S. Cl. ............ 700/121; 700/47; 700/55; 700/104; 700/108
(58) Field of Classification Search .................... 700/47, 700/51, 55, 104, 108–110, 121
  See application file for complete search history.

(56) References Cited

U.S. PATENT DOCUMENTS

| | | | |
|---|---|---|---|
| 6,909,931 B2 | 6/2005 | Liao et al. | |
| 6,999,081 B1 | 2/2006 | Lin et al. | |
| 7,010,382 B2 | 3/2006 | Cheng et al. | |
| 7,144,297 B2 | 12/2006 | Lin et al. | |
| 7,634,325 B2 | 12/2009 | Wang et al. | |
| 7,809,459 B2 * | 10/2010 | Morisawa et al. | 700/109 |
| 2002/0082738 A1 * | 6/2002 | Goldman et al. | 700/109 |
| 2003/0028279 A1 * | 2/2003 | Wang et al. | 700/121 |
| 2007/0100487 A1 * | 5/2007 | Cheng et al. | 700/108 |
| 2008/0275676 A1 | 11/2008 | Lin et al. | |

\* cited by examiner

*Primary Examiner* — Sean Shechtman
(74) *Attorney, Agent, or Firm* — Haynes and Boone, LLP

(57) ABSTRACT

System and method for data mining and feature tracking for fab-wide prediction and control are described. One embodiment is a system comprising a database for storing raw wafer manufacturing data; a data mining module for processing the raw wafer manufacturing data to select the best data therefrom in accordance with at least one of a plurality of knowledge-, statistic-, and effect-based processes; and a feature tracking module associated with the data mining module and comprising a self-learning model wherein a sensitivity of the self-learning model is dynamically tuned to meet real-time production circumstances, the feature tracking module receiving the selected data from the data mining module and generating prediction and control data therefrom; wherein the prediction and control data are used to control future processes in the wafer fabrication facility.

17 Claims, 11 Drawing Sheets

SYSTEM AND METHOD FOR DATA MINING AND FEATURE TRACKING FOR FAB-WIDE PREDICTION AND CONTROL

BACKGROUND

The present disclosure relates generally to fabrication of integrated circuits ("ICs") and, more particularly, to system and method for data mining and feature tracking for fab-wide prediction and control of future manufacturing processes.

Semiconductor IC wafers are produced using a plurality of processes in a wafer fabrication facility ("fab"). These processes, and associated process tools, may include, for example, one or more of thermal oxidation, diffusion, ion implantation, RTP (rapid thermal processing), CVD (chemical vapor deposition), PVD (physical vapor deposition), epitaxy, etch, and photolithography. During the fabrication stages, products (e.g., semiconductor wafers) are monitored and controlled for quality and yield using metrology tools. As IC feature sizes are reduced, the amount of monitoring and control may need to be increased. This in turn increases costs, due to the need for additional metrology tools, additional manpower for performing the monitoring and control, and associated delay in manufacturing cycle time.

Historical wafer manufacturing data provided by process and metrology tools employed in the fab is commonly used by process control systems for prediction and control of future processes in the fab. Currently, the historical manufacturing data is filtered using some set of criteria to obtain data that is "useful" for a particular purpose (e.g., as affecting a measurement of interest) and then the filtered data is input to a model, such a SPICE (Simulation Program with Integrated Circuit Emphasis) sensitivity model, which outputs prediction and control data. At the present time, the model used has a fixed sensitivity and the coefficients are not automatically updated. Additionally, underlying effect analysis for data clustering is not taken into account and the model is not able to meet complicated production circumstances.

SUMMARY

One embodiment is a process control system for a wafer fabrication facility. The system comprises a database for storing raw wafer manufacturing data; a data mining module for processing the raw wafer manufacturing data to select the best data therefrom in accordance with at least one of a plurality of knowledge-, statistic-, and effect-based processes; and a feature tracking module associated with the data mining module and comprising a self-learning model wherein a sensitivity of the self-learning model is dynamically tuned to meet real-time production circumstances, the feature tracking module receiving the selected data from the data mining module and generating prediction and control data therefrom; wherein the prediction and control data are used to control future processes in the wafer fabrication facility.

Another embodiment is a method for implementing a process control system for a wafer fabrication facility. The method comprises accumulating raw wafer manufacturing data; processing the raw wafer manufacturing data to select the best data therefrom in accordance with at least one of a plurality of knowledge-, statistic-, and effect-based processes; receiving the selected data from the data mining module and generating prediction and control data therefrom, the selected data further being used to update a self-learning model for generating the prediction and control data; and using the prediction and control data are used to control future processes in the wafer fabrication facility.

Another embodiment is a process control system for a wafer fabrication facility. The system comprises means for storing raw wafer manufacturing data; means for processing the raw wafer manufacturing data to select the best data therefrom in accordance with at least one of a plurality of knowledge-, statistic-, and effect-based processes; and means associated with the data mining module and comprising a self-learning model wherein a sensitivity of the self-learning model is dynamically tuned to meet real-time production circumstances for receiving the selected data from the data mining module and generating prediction and control data therefrom; wherein the prediction and control data are used to control future processes in the wafer fabrication facility.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The present disclosure relates generally to fabrication of integrated circuits ("ICs") and, more particularly, to system and method for data mining and feature tracking for fab-wide prediction and control of future manufacturing processes. It is understood, however, that specific embodiments are provided as examples to teach the broader inventive concept, and one of ordinary skill in the art can easily apply the teachings of the present disclosure to other methods and systems. Also, it is understood that the methods and systems discussed in the present disclosure include some conventional structures and/or steps. Since these structures and steps are well known in the art, they will only be discussed in a general level of detail. Furthermore, reference numbers are repeated throughout the drawings for the sake of convenience and example, and such repetition does not indicate any required combination of features or steps throughout the drawings.

The embodiments described herein combine knowledge- and statistics-based solutions for golden data mining and preparation and implement underlying effect analysis for data clustering. The embodiments additionally enable dynamic and automatic sensitivity tuning that more closely adhere to production circumstances. In particular, self-learning sensitivity, which may be at least partially implemented using artificial intelligence ("AI") technology, is dynamically tuned to meet real-time production circumstances. Underlying effect analysis is taken into consideration in a systematic flow and a data mining procedure that combines knowledge- and statistics-based solutions to result in more accurate filter sensitivity.

Figure 1:
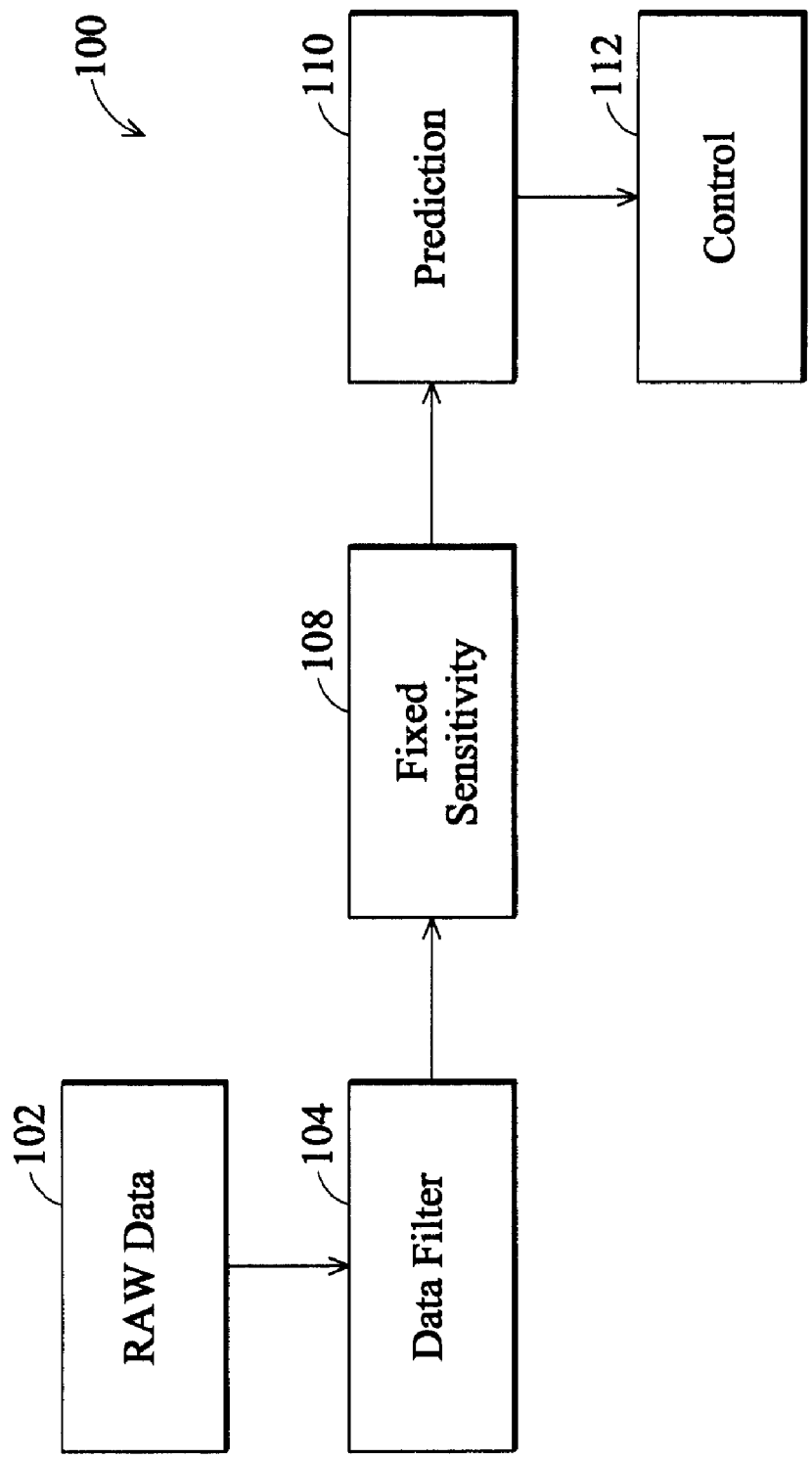
FIG. 1 is a block diagram of a prior art process control system for prediction and control of various aspects of wafer fabrication.

FIG. 1 illustrates a block diagram of a prior art process control system 100 for a at least a portion of a wafer fabrication process. The system 100 is employed in a wafer fab and includes a database 102 in which is stored raw production and manufacturing data for wafers previously manufactured in the fab. The raw production and manufacturing data is input to the database 102 from various metrology and process tools. In operation, the raw data stored in the data base 102 is filtered by a data filter module 104, which filters out data deemed unuseful by some set of user-defined criteria, and the resultant "useful" data is input to a process model 108. As will be apparent to one of ordinary skill in the art, the process model 108 may be designed to model a process or group of processes performed on wafers in the fab. In accordance with features of the prior art, the model 108 has a fixed sensitivity. For example, assuming the model is a SPICE model, the coefficients are fixed in accordance with a sensitivity table, such as the sensitivity table shown below as Table 1. The model 108 operates on the production data input thereto from the data filter module 104 to generate prediction data 110, which may be used to predict the results of future processes modeled by the model 108 and which my also be used to generate control data 112 for controlling one or more processes in the fab in a conventional manner.

TABLE 1

| Stage | Unit | Core_N | Core_P |
|-------|------|--------|--------|
| OD    | 1 nm | 0.20%  | 0.10%  |
| GOX   | 1 A  | 2.65%  | 2.05%  |
| PO    | 1 nm | 1.55%  | 1.35%  |
| SiGe  | 1 nm |        | 1.50%  |
| LDD   | 1E12 | 0.80%  | 0.75%  |
| SW    | 1 nm | 1.45%  | 0.75%  |

Figure 2:
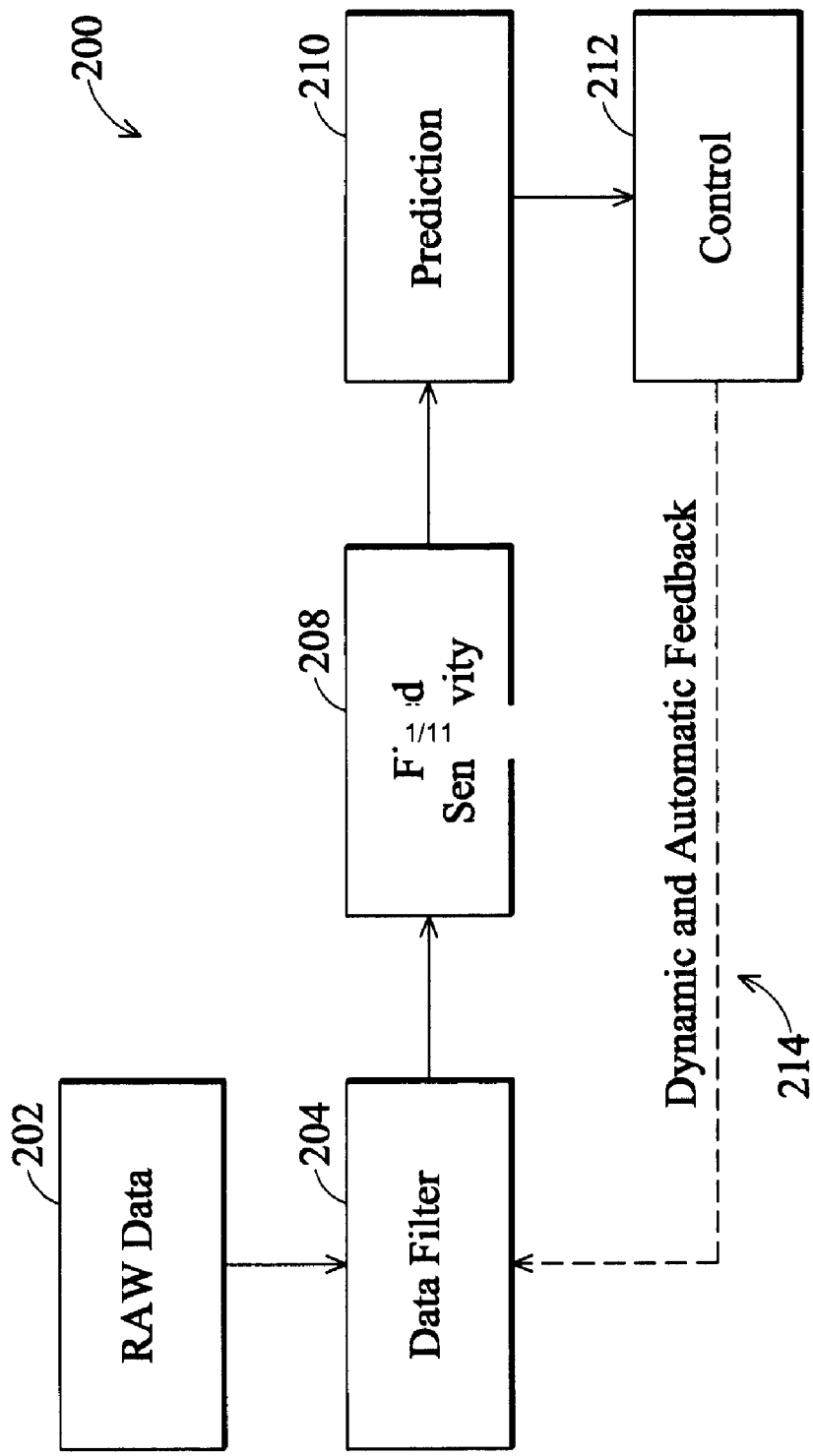
FIG. 2 is a block diagram of a process control system for prediction and control of various aspects of wafer fabrication in accordance with one embodiment.

FIG. 2 illustrates a block diagram of a process control system 200 for a wafer fab in accordance with one embodiment. Similarly to the system 100, the system 200 accesses raw wafer manufacturing data stored in a manufacturing database 202; however, in the system 200, the raw data is input to a data mining module 204, instead of a simple data filter, which processes the data in a manner that will be described in detail below. The processed data is then output from the data mining module to a feature tracking module 208. As also will be further described, the Feature Tracking module 208 is a self-learning model. The feature tracking module 208, the operation of which will be described in greater detail below, is designed to model a process or group of processes performed on wafers in the fab and is similar to the model 108 (FIG. 1) except that the module 208 implements a self-learning model and the sensitivity table thereof is updatable.

The module 208 operates on the data mined by the module 204 to output prediction data 210, which is used to predict the results of future processes and which may also be used to generate control data 212 for controlling one or more processes in the fab in a conventional manner. In contrast with the system 100, the control data 212 from the system 200 is also fed back to and used to update the data mining module 202 dynamically and automatically for improving data mining quality and feature tracking accuracy.

Figure 3A:
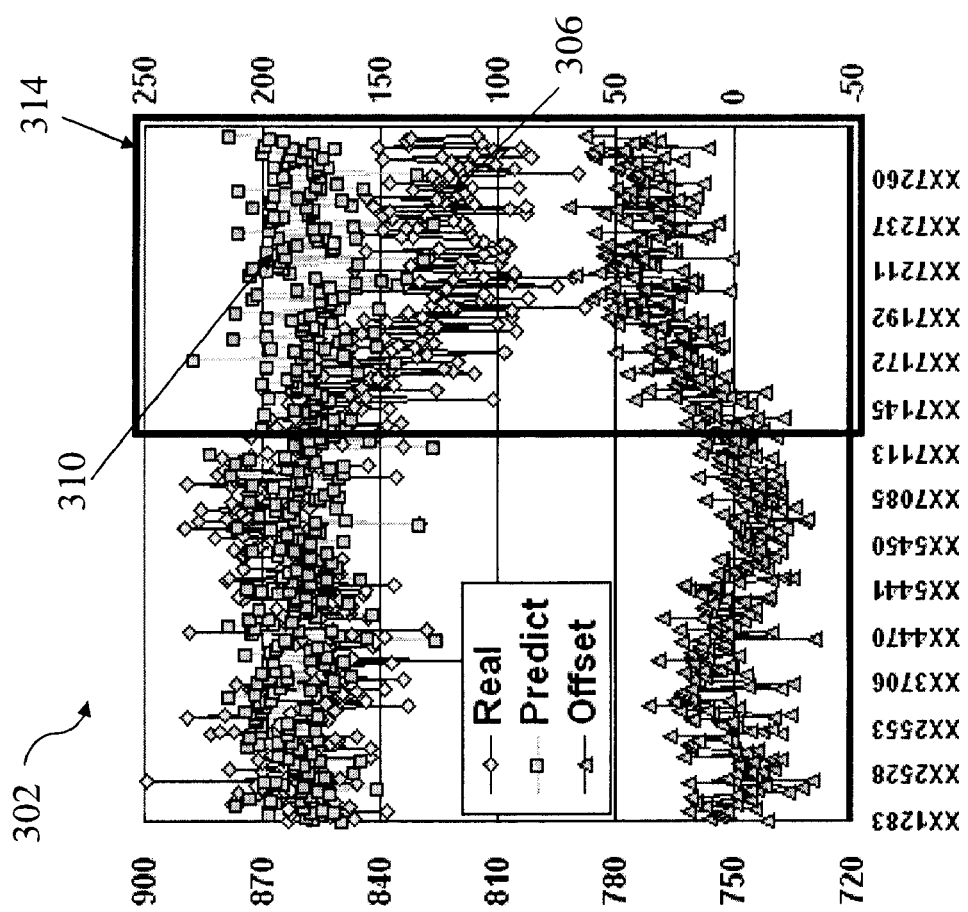
FIGS. 3A and 3B illustrate tables demonstrating improvement in predicted data vs. actual data for a process realizable using the system of FIG. 2.
Figure 3B:
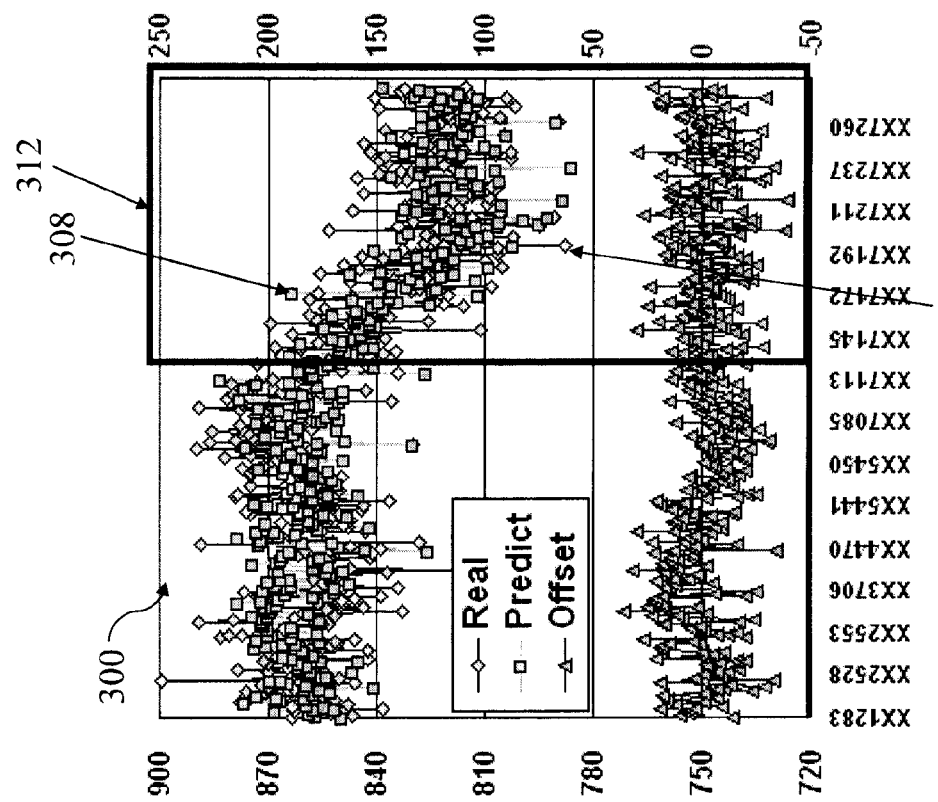

FIGS. 3A-3B illustrate the improvement in the predicted data vs. actual data for a process realizable using the system 200, as shown in a table 300, versus the system 100, as shown in a table 302. Actual, or real, data is represented in tables 300 and 302 as points comprising lines 304 and 306, respectively. The data predicted by the system 200, as represented by points comprising a line 308, is much closer to the actual data than is the data predicted by the system 100, as represented by points comprising a line 310, as demonstrated by the proximity of the lines 304 and 308 as compared to that of the lines 306 and 310. This is especially evident in areas 312, 314, of the tables 300, 302, respectively. It is apparent from the tables comprising FIGS. 3A-3B that the system 200 performs in a manner superior to the system 100 in predicting the actual data.

Figure 4:
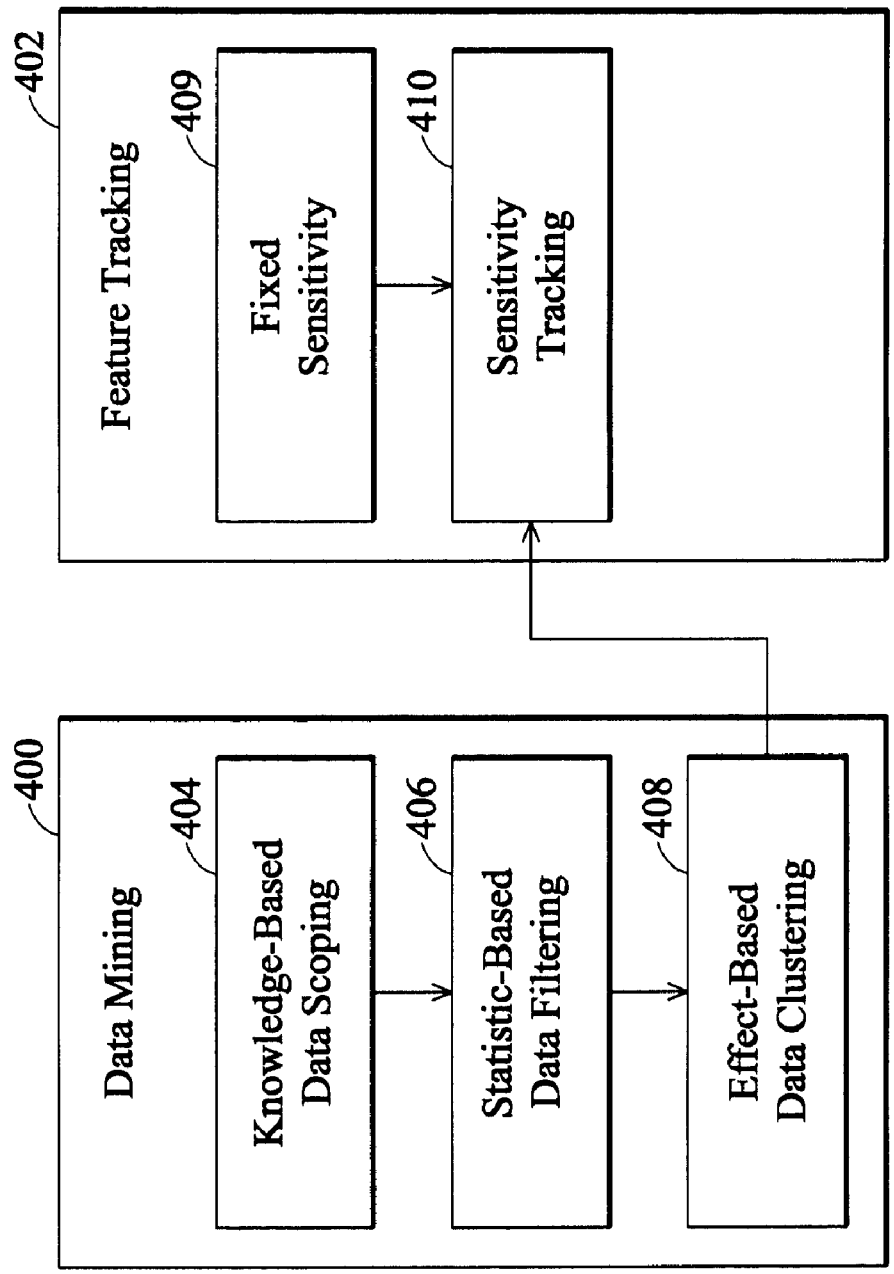
FIG. 4 is a flowchart illustrating operation of the data mining and feature tracking features of the embodiment of FIG. 2.

FIG. 4 is a high-level flow diagram illustrating operation of the data mining and feature tracking features of an embodiment such as the one illustrated in FIG. 2. The embodiment shown in FIG. 4 includes a data mining portion 400 and a feature tracking portion 402. Referring first to the data mining portion 400, data mining comprises three steps, including knowledge-based data scoping 404, statistics-based data filtering 406, and effect-based data clustering 408. The steps 404, 406, and 408, maybe performed in any order and multiple ones of the steps maybe performed simultaneously. Each of these will be described in greater detail below with reference to FIG. 5.

The feature tracking portion 402 is includes a sensitivity tracking step 410 which receives inputs from the data mining portion 400 as well as from a fixed sensitivity model 409, which is a similar type of model to the one described with reference to FIG. 1. The elements of the feature tracking portion 402 will be described in greater detail below with reference to FIG. 7.

Figure 5:
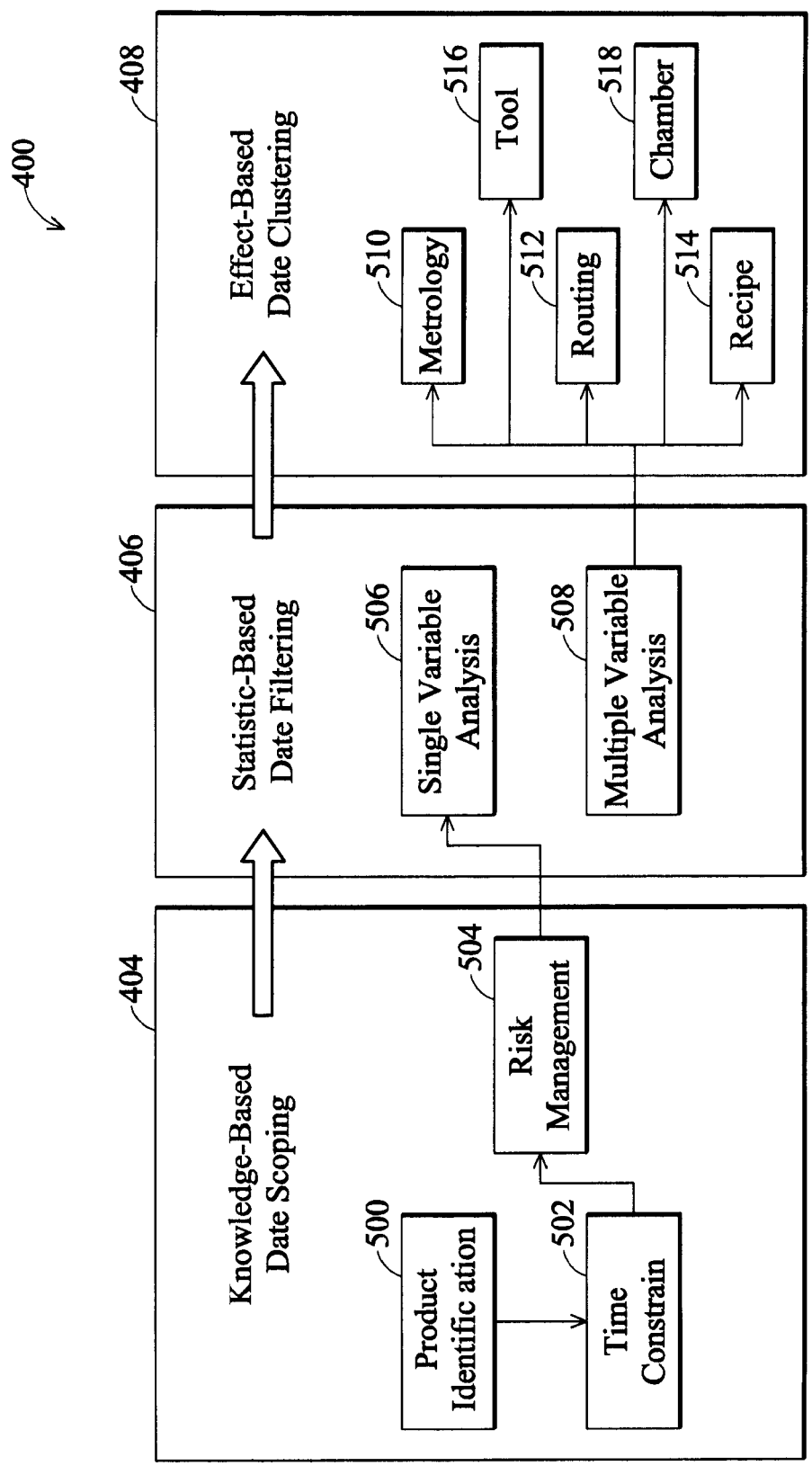
FIG. 5 is a more detailed flowchart of the operation of the data mining feature of FIGS. 3A-3B.
Figure 6A:
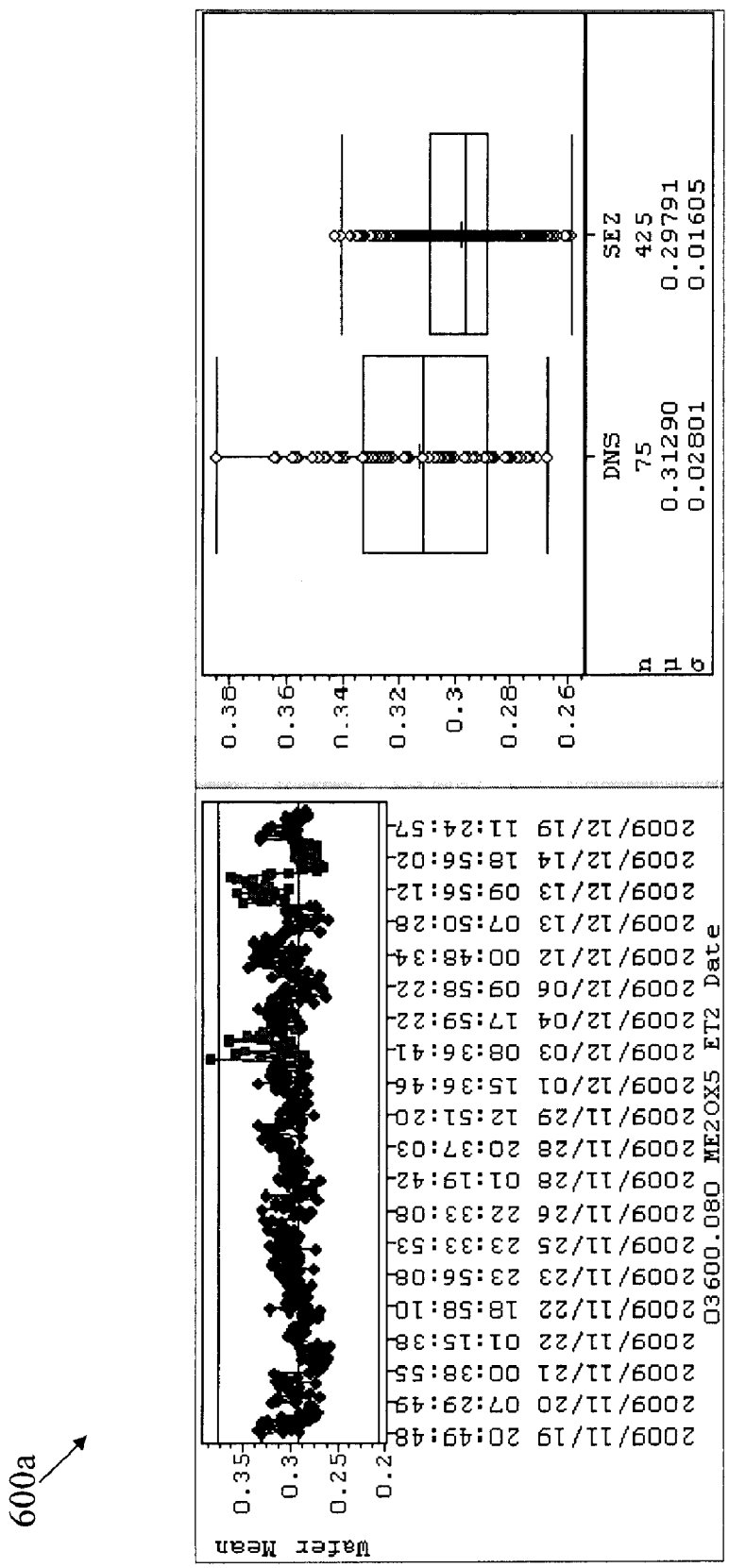
FIGS. 6A-6D illustrate data clustering with respect to two process tools.
Figure 6B:
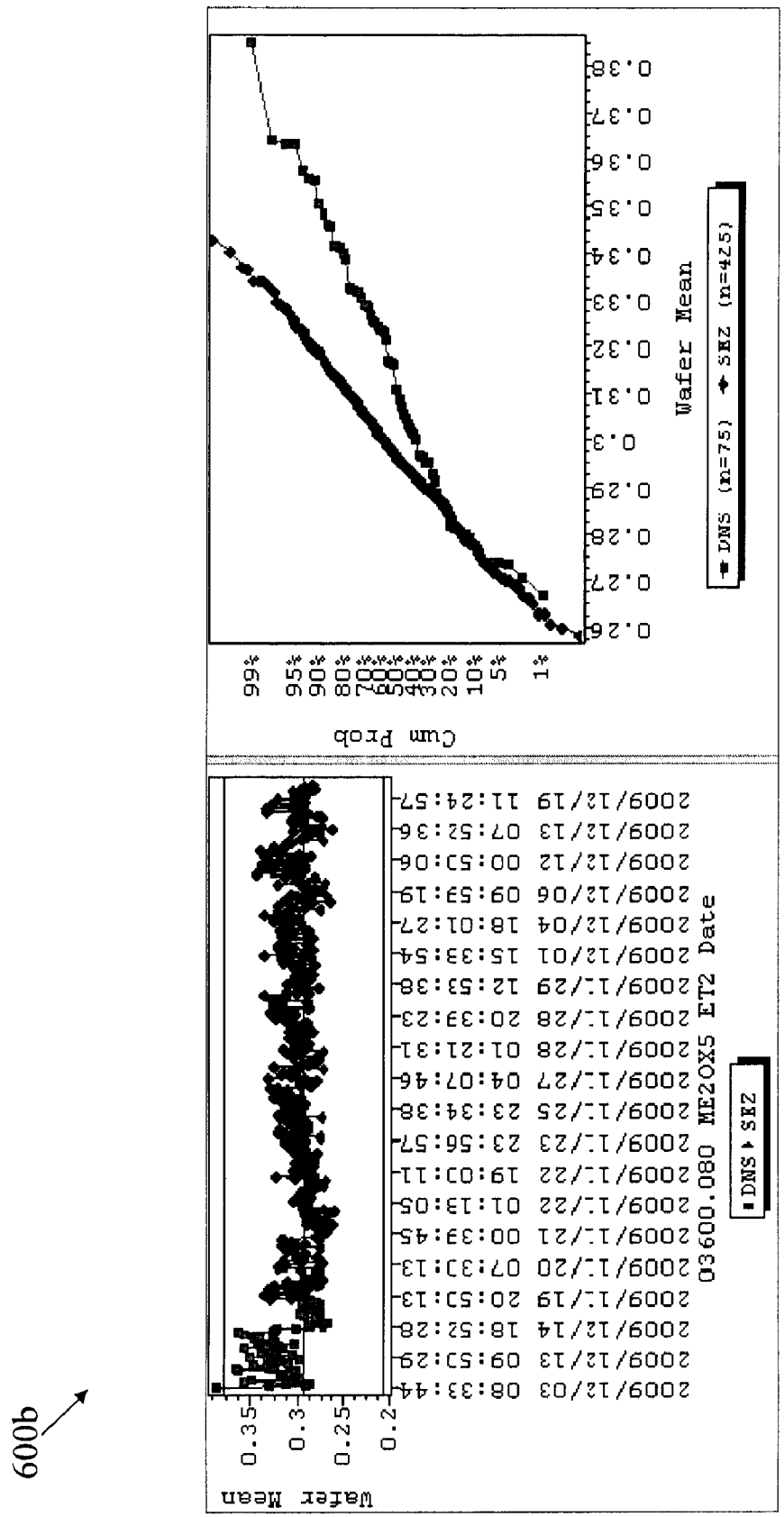
Figure 6C:
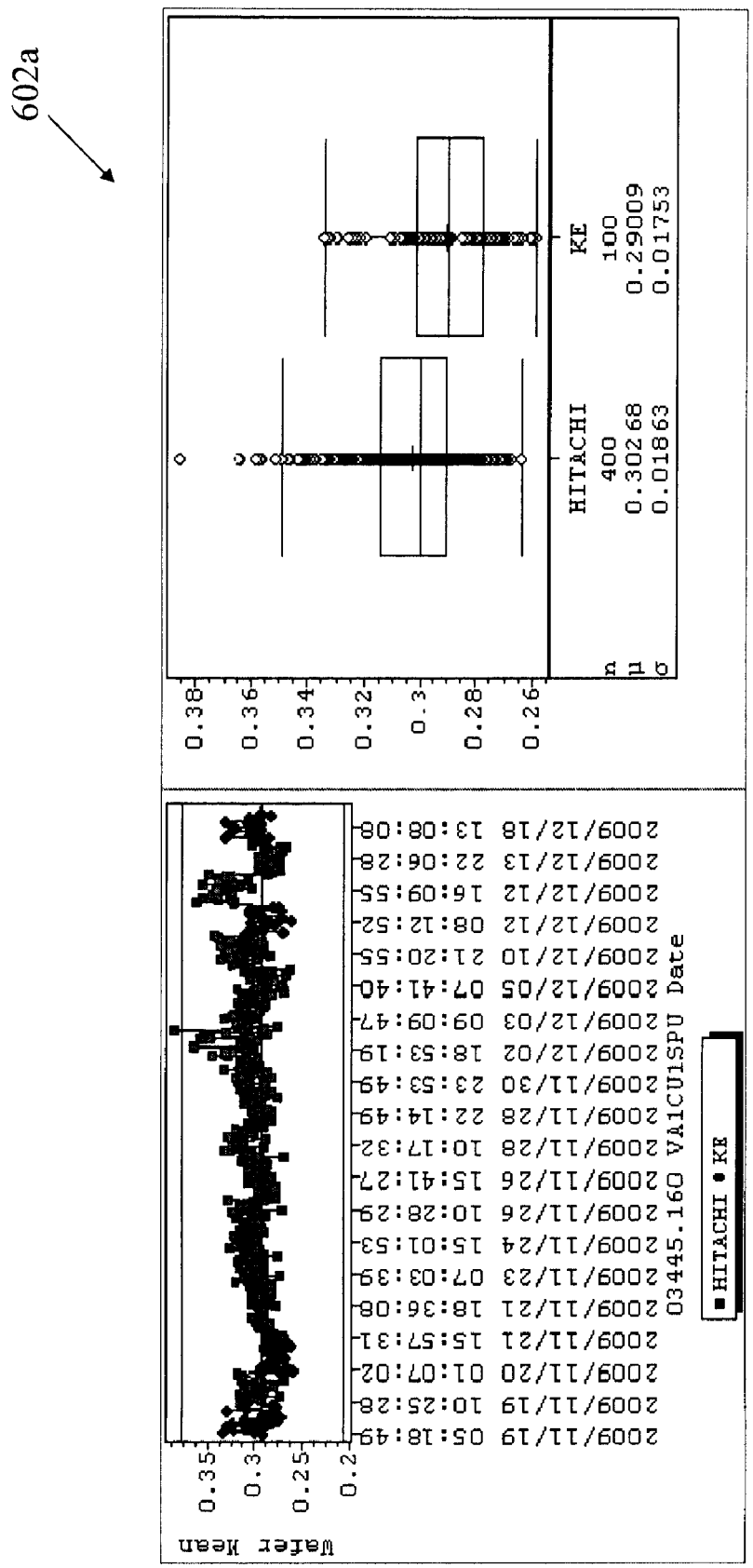
Figure 6D:
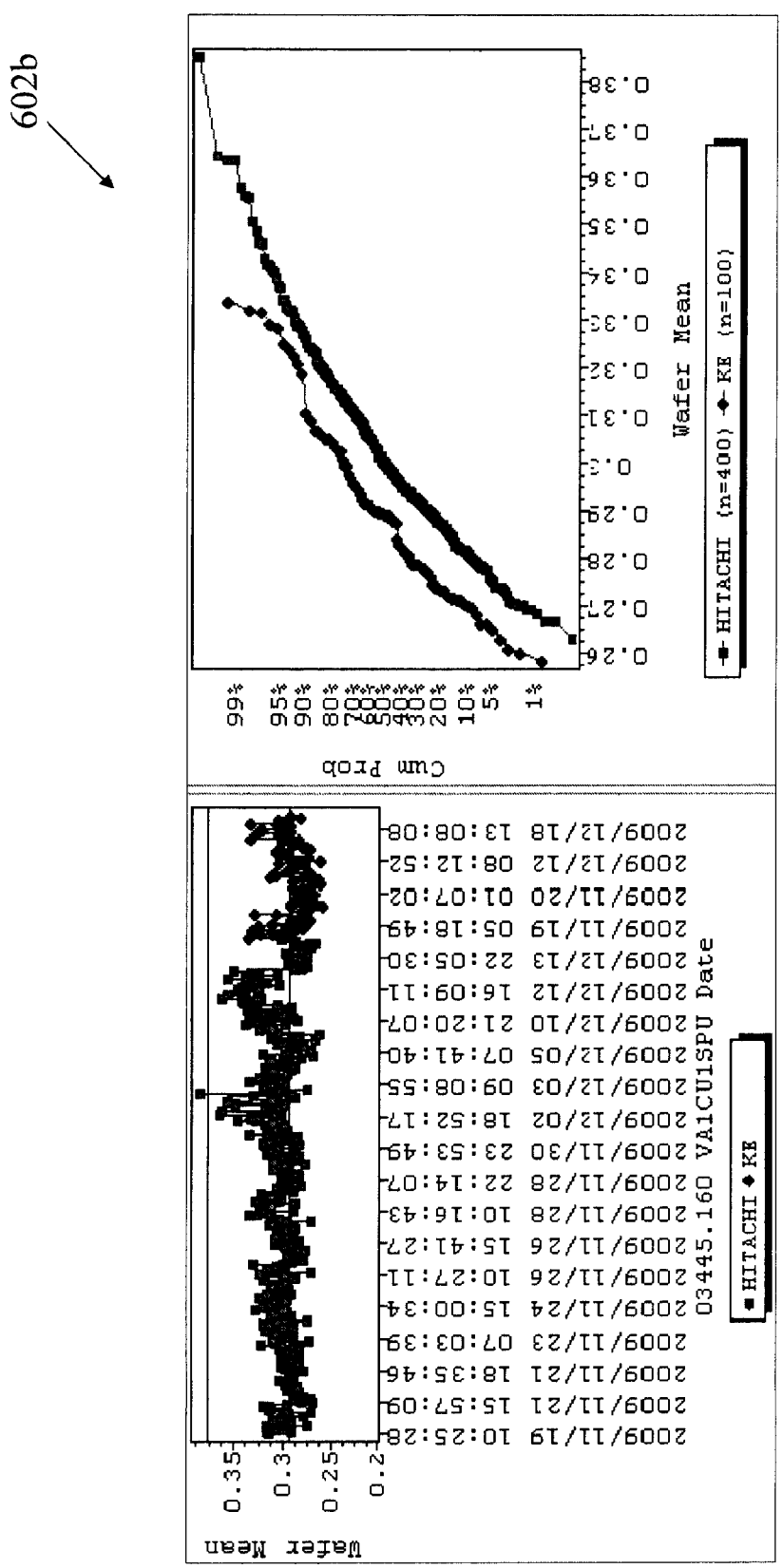

FIG. 5 illustrates data scoping 404 in greater detail. The purpose of data scoping is to consolidate and enhance data quality for data mining based on the idea that if the quality of the data is poor, the quality of the results will be poor; therefore, by improving the quality of the data used for prediction and control, the quality of the results will also be improved. As shown in FIG. 5, the data scoping 404 can be broken down in to three steps, including product identification 500, time constraining 502, and risk management 504. Product identification 500 is performed to define which specific product will be used for data scoping; this prevents the inclusion of variation data in the analysis. For example, in a fab, IC fabrication has a different process flow for different IC performance/results. The same full part ID in the fab means the same mask, the same route, the same process, and the same recipe in same stage. Product identification is a knowledge-based solution.

Time constraining 502 is also performed. In manufacturing, the fabrication process flow/recipe has small changes and may have performance differences. The current IC performance, such as physical and electrical performance is different depending on the time frame. Therefore, for optimum data mining, the time period for the data must be constrained. Time constraining is a knowledge-based solution. Risk management 504 is also performed. This is also a knowledge-based solution. In particular, future tracking is for normal/stable processes; therefore, abnormal or "risky" data is excluded from consideration. For example, data that was impacted by a tool alarm is excluded. Product identification 500, time constraining 502, and risk management 504 can be performed in any order and one or more may be performed simultaneously.

FIG. 5 further illustrates statistic-based data filtering in greater detail. In particular, statistic-based data filtering can be broken down into two parts, including single variable analysis 506 and multiple variable analysis 508. Both single and multiple variable analysis comprises statistics-based solutions. Single variable analysis 506 filters the data using one or more 2D statistical solutions, such as IQR or 3*Sigma, for example. Multiple variable analysis 508 filters the data using one or more 3D statistical solutions, such as PCA or factor analysis, for example. The purpose of the analyses 506, 508 is to enhance data quality and to exclude outlier data from consideration. The analyses 506, 508, may be performed in any order or simultaneously.

FIG. 5 further illustrates effect-based data clustering 408 in greater detail. In one embodiment, effect-based data clustering analysis is performed with respect to metrology effects 510 (in-line and WAT), routing effects 512 (BKM, RWK, and Q-time), recipe effects 514, tool effects 516, and/or chamber effects 518. In particular, each of the foregoing is considered, analyzed, and calculated to separating or compensating bias of different effect. FIGS. 6A-6D illustrates this concept in greater detail with respect to a metal wet etch tool results 600a and 600b, and metal baking tool results 602a and 602b, showing different values for each of the tools.

Figure 7:
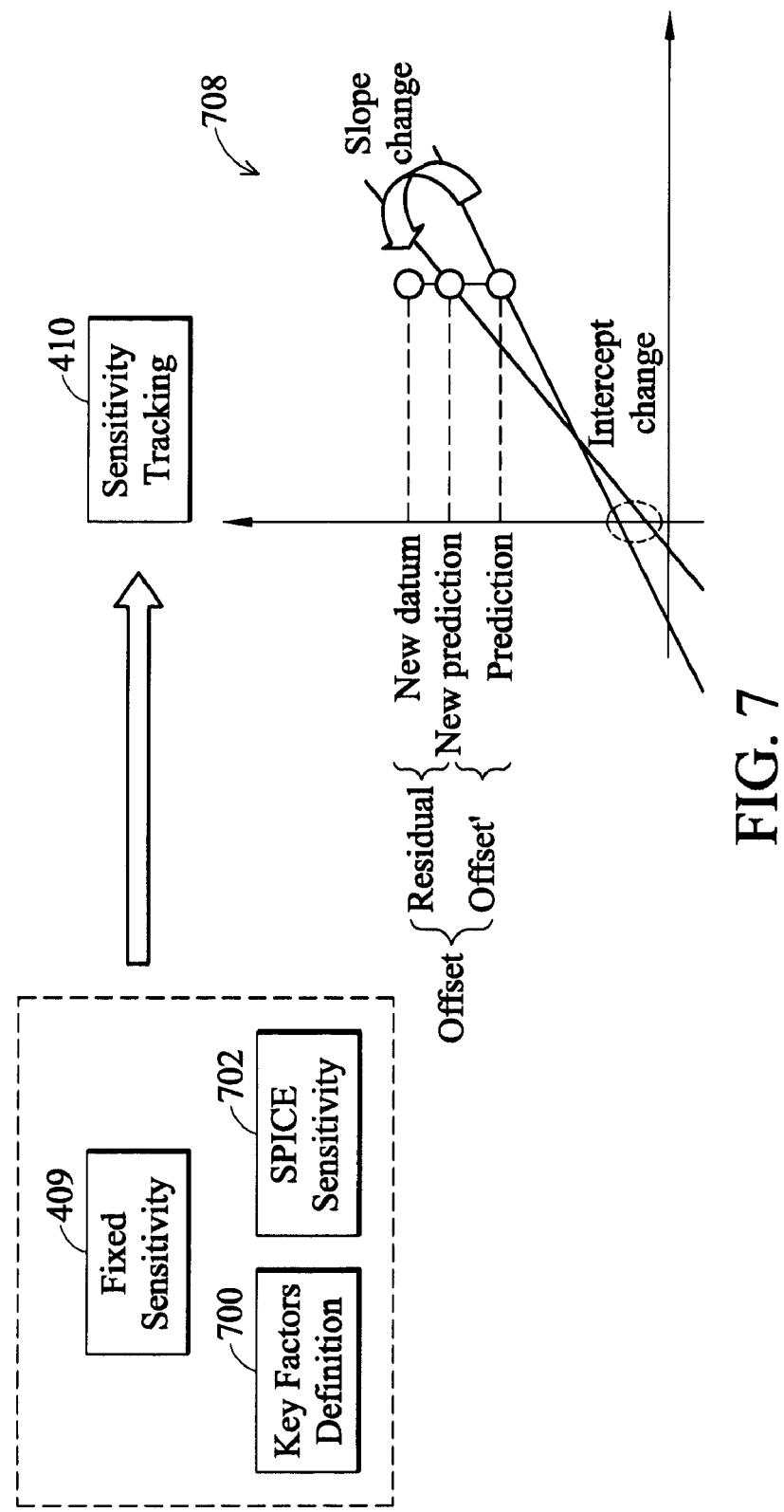
FIG. 7 is a more detailed flowchart of the operation of the feature tracking feature of FIGS. 3A-3B.

Referring now to FIG. 7, the feature tracking flow and criteria will be explained in greater detail. The fixed sensitivity portion 409 of the feature tracking 402 includes a key factors definition 700 and a SPICE sensitivity portion 702. The key factors definition 700 defines the key factors for the model implemented by the feature tracking using knowledge-based and statistical analysis (e.g., by coefficient of correlation ("COC")). SPICE sensitivity 702 is the key factors' sensitivity at the RD/SPICE state; at the initial state, the actual sensitivity will be different, but will certainly be similar to current. The sensitivity of factors is the base for following sensitivity tracking. The tracking function is based on the initial sensitivity value, as shown in a sensitivity table, such as the sensitivity table shown below as Table 2. Feature tracking results are similar to the SPICE sensitivity, with fine adjustments to the last one.

TABLE 2

| Stage | Unit | Core_N | Core_P |
|---|---|---|---|
| OD | 1 nm | 0.20% | 0.10% |
| GOX | 1 A | 2.65% | 2.05% |
| PO | 1 nm | 1.55% | 1.35% |
| SiGe | 1 nm | | 1.50% |
| LDD | 1E12 | 0.80% | 0.75% |
| SW | 1 nm | 1.45% | 0.75% |

Sensitivity tracking 410 is performed in accordance with an equation 706 (FIG. 7), which is also reproduced below for ease of reference:

$$y = a_1 x_1 + a_2 x_2 + a_3 x_3 \ldots + a_n x_n + a_{n+1} x_{n+1} + \delta$$

where
y=the data to be predicted;
$x_1$-$x_n$=key factors (e.g., CD, THK, depth, recipe);
$x_{n+1}$=1
$a_1$-$a_n$=sensitivity (weights);
$a_{n+1}$=the intercept; and
δ=an offset to account for noise.

For example, assuming y is sheet resistance (Rs), then key factors $x_1$-$x_4$ may be MCD, TCD, THK, and Depth, respectively, and $a_1$-$a_4$ are the sensitivities of the respective key factors to Rs.

The effects of the sensitivity tracking methodology, as embodied in the above-noted equation, are illustrated in a graph 708. As shown in the series of equations below, the sensitivities of the above-noted equation may be updated:

$$E = (y_{new} - y_{predict})^2$$

$$\min_{x_i}(E')$$

$$\Delta a_i = a_{i,new} - a_{i,old}$$
$$= -\eta \frac{\partial E'}{\partial a_i} \quad \eta: \text{Learning rate}$$
$$= 2\eta * (y_{new} - y_{predict})|_{g'} * x_i$$

$$a_{i,new} = a_{i,old} + \Delta a_i$$
$$= a_{i,old} + 2\eta * (y_{new} - y_{predict})|_{g'} * x_i$$
$$= a_{i,old} + \eta' * sgn(y_{new} - y_{predict}) * sqrt(E') * x_i$$

$$E' = \text{Filter}(E) = w * E + (1 - w) * E_{EWMA}$$

$$\boxed{\frac{\partial E'}{\partial a_i} = \frac{\partial E'}{\partial y_{predict}} \frac{\partial y_{predict}}{\partial a_i} = -2(y_{new} - y_{predict})|_{g'} \frac{\partial y_{predict}}{\partial a_i}}$$
$$\frac{\partial y_{predict}}{\partial a_i} = x_i$$

η: Learning rate

E is the energy function, which is also known as an object function for optimization (minimization). A filter (e.g., an EWMA filter) is used to smooth the values of the energy function before performing optimization. There are several filter options besides EWMA that can be used. Sgn( ) function is the sign (i.e., + or −) of ($y_{new}$-$y_{prediction}$). η is the learning rate and is usually case-dependent. Greater values of η imply faster tracking responses, but may result in unacceptable performances oscillation. Lower values of η imply slower tracking responses, but may result in relatively stable performance.

It will be recognized that all or any portion of the embodiments described herein maybe implemented using a computer program comprising computer executable instructions stored on one or more computer-readable media, which instructions are executed by computer hardware, including at least one processor, for carrying out the functions described herein.

Although only a few exemplary embodiments of this invention have been described in detail above, those skilled in the art will readily appreciate that many modifications are possible in the exemplary embodiments without materially departing from the novel teachings and advantages of this invention.

It is understood that various different combinations of the above-listed embodiments and steps can be used in various sequences or in parallel, and there is no particular step that is critical or required. Furthermore, features illustrated and discussed above with respect to some embodiments can be combined with features illustrated and discussed above with respect to other embodiments. Accordingly, all such modifications are intended to be included within the scope of this invention.

What is claimed is:

1. A process control system for a wafer fabrication facility, the system comprising:
   a database for storing raw wafer manufacturing data;
   a data mining module for processing the raw wafer manufacturing data to select a subset of data therefrom using knowledge-based data scoping, statistics-based data filtering, and effect-based data clustering; and
   a feature tracking module associated with the data mining module and comprising a process model configured to model a wafer fabrication process using the selected data received from the data mining module, wherein the process model includes a plurality of sensitivity coefficients associated with the selected data that are dynamically tuned to meet real-time production circumstances, the feature tracking module being configured to generate prediction and control data with the process model;

wherein the prediction and control data are used to control future processes in the wafer fabrication facility.

2. The process control system of claim 1 wherein the data mining module is a self-learning module.

3. The process control system of claim 1 wherein the control data is used to optimize the data mining module.

4. The process control system of claim 1 wherein the feature tracking module comprises a fixed sensitivity model and a sensitivity tracking module for updating the fixed sensitivity model in accordance with real-time production circumstances.

5. The process control system of claim 1 wherein the knowledge-based data scoping comprises at least one of product identification, time constraining, and risk management with respect to the raw data.

6. The process control system of claim 1 wherein the statistic-based data filtering comprises at least one of single-variable analysis and multiple variable analysis.

7. The process control system of claim 1 wherein the effect-based data clustering comprises at least one of metrology effect analysis, routing effect analysis, recipe effect analysis, tool effect analysis, and chamber effect analysis.

8. A method for implementing a process control system for a wafer fabrication facility, the method comprising:
   accumulating raw wafer manufacturing data;
   processing the raw wafer manufacturing data to select a subset of data therefrom using knowledge-based data scoping, statistics-based data filtering, and effect-based data clustering;
   receiving the selected data and generating prediction and control data therefrom with a process model configured to model a wafer fabrication process, wherein the process model includes a plurality of sensitivity coefficients associated with the selected data that are dynamically tuned to meet real-time production circumstances, the selected data further being used to update the process model for generating the prediction and control data; and
   using the prediction and control data to control future processes in the wafer fabrication facility.

9. The method of claim 8 wherein the control data is used to optimize the raw wafer manufacturing data process.

10. The method of claim 8 further comprising updating the process model in accordance with real-time production circumstances.

11. The method of claim 8 wherein the knowledge-based data scoping comprises at least one of product identification, time constraining, and risk management with respect to the raw data.

12. The method of claim 8 wherein the statistic-based data filtering comprises at least one of single-variable analysis and multiple variable analysis.

13. The method of claim 8 wherein the effect-based data clustering comprises at least one of metrology effect analysis, routing effect analysis, recipe effect analysis, tool effect analysis, and chamber effect analysis.

14. A process control system for a wafer fabrication facility, the system comprising:
   means for storing raw wafer manufacturing data;
   means for processing the raw wafer manufacturing data to select a subset of data therefrom using knowledge-based data scoping, statistics-based data filtering, and effect-based data clustering; and
   means for receiving the selected data from the processing means and generating prediction and control data therefrom with a process model configured to model a wafer fabrication process using the selected data received from the processing means, wherein the process model includes a plurality of sensitivity coefficients associated with the selected data that are dynamically tuned to meet real-time production circumstances;
   wherein the prediction and control data are used to control future processes in the wafer fabrication facility.

15. The process control system of claim 14 wherein the knowledge-based data scoping comprises at least one of product identification, time constraining, and risk management with respect to the raw data.

16. The process control system of claim 14 wherein the statistic-based data filtering comprises at least one of single-variable analysis and multiple variable analysis.

17. The process control system of claim 14 wherein the effect-based data clustering comprises at least one of metrology effect analysis, routing effect analysis, recipe effect analysis, tool effect analysis, and chamber effect analysis.

* * * * *